(12) United States Patent
Rivin

(10) Patent No.: US 6,588,967 B2
(45) Date of Patent: Jul. 8, 2003

(54) JOINT

(76) Inventor: Evgeny I. Rivin, 4227 Foxpointe Dr., West Bloomfield, MI (US) 48323

( * ) Notice: Subject to any disclaimer, the term of this patent is extended or adjusted under 35 U.S.C. 154(b) by 99 days.

(21) Appl. No.: 09/951,208

(22) Filed: Apr. 6, 2001

(65) Prior Publication Data

US 2002/0172546 A1 Nov. 21, 2002

(51) Int. Cl.$^7$ .................. F16C 11/00; F16D 1/12
(52) U.S. Cl. .................. 403/130; 403/132; 403/133; 403/137
(58) Field of Search .................. 403/130, 131, 403/128, 127, 122, 123, 126, 133, 132, 135, 137, 138, 170, 169, 176, 179, 203, 202, 217, 218, 404, 41

(56) References Cited

U.S. PATENT DOCUMENTS

| 4,194,372 A | * | 3/1980 | Hannibal ................. 64/11 R |
| 4,244,677 A | * | 1/1981 | Noehren et al. ........ 416/134 A |
| 6,405,773 B1 | * | 6/2002 | Vossberg et al. ............ 152/516 |

* cited by examiner

*Primary Examiner*—Christopher J. Novosad

(57) ABSTRACT

A three-dimensional (spherical) joint for connecting mechanical links has its concave and convex concentrical spherical surfaces connected by preloaded in compression high shape factor (thin-layered) elastomeric elements, whose shear deformation provides for 3D mobility.

13 Claims, 2 Drawing Sheets

JOINT

FIELD OF THE INVENTION

The present invention relates to connecting elements (joints) allowing for angular displacements between mechanical components (links).

BACKGROUND OF THE INVENTION

Components of mechanical systems are often required to be movable relative to each other in angular (rotational) motion about three intersecting mutually perpendicular axes while maintaining their relative distances in translational directions.

Examples of such applications are steering systems of surface vehicles (cars and trucks), wrists of robotic devices, connections between tension-compression struts and base and moving platform in so-called "parallel kinematics" machine tools (Stewart Platform designs, Hectapods), etc.

Usually, such connections between mechanical components are realized by spherical (ball) joints. A typical ball joint (see also Prior Art, FIG. 1) has an accurately fabricated steel ball attached to one of the connected mechanical components. The ball is fit into precision socket (spherical cavity of essentially the same radius) attached to the other connected mechanical component. The socket is specially designed to realize a captive engagement with the ball. Since the connection must withstand tension/compression loads between the connected components, contact between the ball and the socket should be lubricated and designed as a wear and friction-resistant pair, usually the hardened and ground steel ball riding against polished bronze surface of the socket. Attachment in a precision manner of one component connected by the joint to the hardened steel ball requires expensive manufacturing operations. Fabrication of the precision spherical cavity and the multi-part design of the socket to achieve the captivity effect can also be expensive. The device must be sealed against leakage of the lubricant and against contamination. Since some space between the ball and the socket is required to accommodate the lubricant, such connection always exhibits backlash for relative translational movements of the connected components. Presence of the backlash is usually undesirable but its elimination by applying preload would greatly increase friction in the joint and would complicate the design; it also requires even more precision fitting in order to reduce the clearance between the ball and the socket.

Thus, the prior art is represented by an expensive design requiring high-quality materials and high-precision fabrication. In the same time, the prior art ball joint has high friction even with lubrication, especially at high translational loads transmitted through the connection and at the reversal points of the relative motions between the ball and the socket since at these points there are no motions and thus no hydrodynamic effect. As a result, these points are characterized by boundary lubrication conditions and thus, high friction. When high tension/compression forces are acting between the connected links, these forces are acting as normal forces in the contact between the ball and the socket, thus generating high friction forces not desirable for functioning of the joint. Since the ball and the socket are frictionally connected, their relative motion begins only after the driving torque/moment exceeds the moment due to the static friction. As a result, conventional ball joints are not responding to input driving torques of small magnitudes.

The costs of conventional ball joints are high due to the required high precision and further increase due to the need for precision assembly of several parts of the socket (in order to achieve the captive effect) and for providing lubrication and sealing systems.

SUMMARY OF THE INVENTION

The present invention addresses the inadequacies of the prior art by providing a three-degrees-of-freedom rotational joint which retains the kinematic structure of the prior art spherical joint but does not have its design shortcomings. The preferred embodiment of the proposed joint comprises at least one high shape factor (thin-layered) elastomeric element whose inner and outer surfaces are concentric spherical surfaces with the center coinciding with the intersection point of the three rotational axes of the joint. The elastomeric element is preloaded in compression. The shape factor is commonly defined as ratio of the loaded surface area to the total free side surface areas. The inner (concave) and the outer (convex) surfaces of the elastomeric element are supported by rigid convex and concave spherical surfaces, respectively, attached to the mechanical links connected by the joint. In this design, relative angular displacements (rotations) between the connected mechanical links are accommodated by shear deformations in the thin-layered elastomeric elements. In the same time, translational forces between the connected mechanical components and the preload forces are accommodated by compression of the thin-layered elastomeric elements. It is known that large shear deformations are realizable (up to and sometimes exceeding 100–150% of thickness of the elastomeric element), while compression stiffness is at least 1–5,000 times greater than the shear stiffness. The compression deformations are much smaller than shear deformations, and very high specific compression loads can be accommodated, up to and exceeding 650 MPa (100,000 psi). Since these loads are way above the specific pressures allowable for frictional connections, the size of the proposed joint can be reduced for a given rated load.

Since the mobility in the proposed joint is due to internal shear deformations, no lubrication or sealing is required. Since it is known that the shear resistance is not significantly influenced by compression forces, the preload does not increase the resistance to angular motions while completely eliminating the undesirable backlash. The preload also keeps the convex (convex spherical member) and the concave (socket) rigid spherical surfaces in a force-locked condition for any directions of the translational forces (compression or tension), thus the captive design of the prior art ball joint is not needed and the complexity of the unit is reduced. Since there is no direct contact between the spherical member and the inside surface of the socket, both can be made from a variety of materials including inexpensive metals without heat treatment, plastics, etc., and no expensive surface finishing is required.

Use of internal shear deformation instead of sliding friction makes the joint sensitive to input torques/moments of any magnitude, even very small.

BRIEF DESCRIPTION OF THE DRAWINGS

The present invention can best be understood with reference to the following detailed description and drawings in which.

DETAILED DESCRIPTION OF THE PREFERRED EMBODIMENTS

Figure 1:
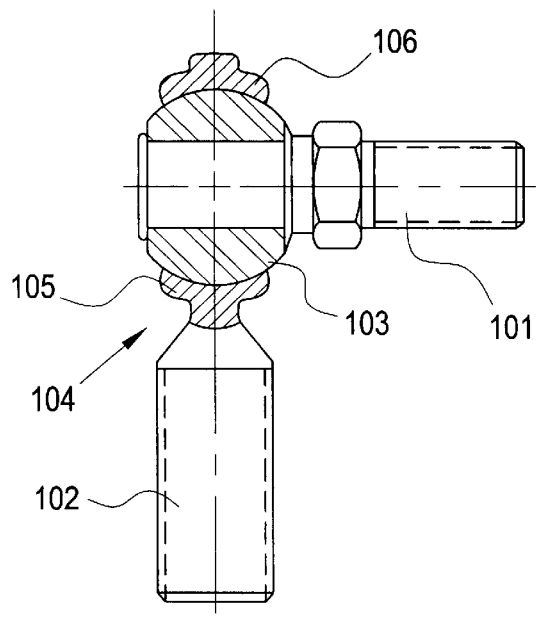
FIG. 1 is an axial cross section of conventional (sliding friction based) spherical joint (the Prior Art)

FIG. 1 depicts one embodiment of the conventional ball joint (Prior Art). Links 101 and 102 are fastened, respectively, to ball 103 (usually made from hardened steel) and socket 104. Socket 104 has lower 105 and upper 106 segments of spherical cavity surrounding ball 103. These segments are joined together on the diametric plane perpendicular to the plane of the drawing (the connection details are not shown). Connection of parts 105 and 106 creates a captive engagement between socket 104 and ball 103.

Angular movements in three-degrees-of-freedom between links 101 and 102 are accommodated by sliding between ball 103 and spherical segments 105 and 106. These movements are limited by interference between the links and between link 101 and edges of socket 104.

Figure 2:
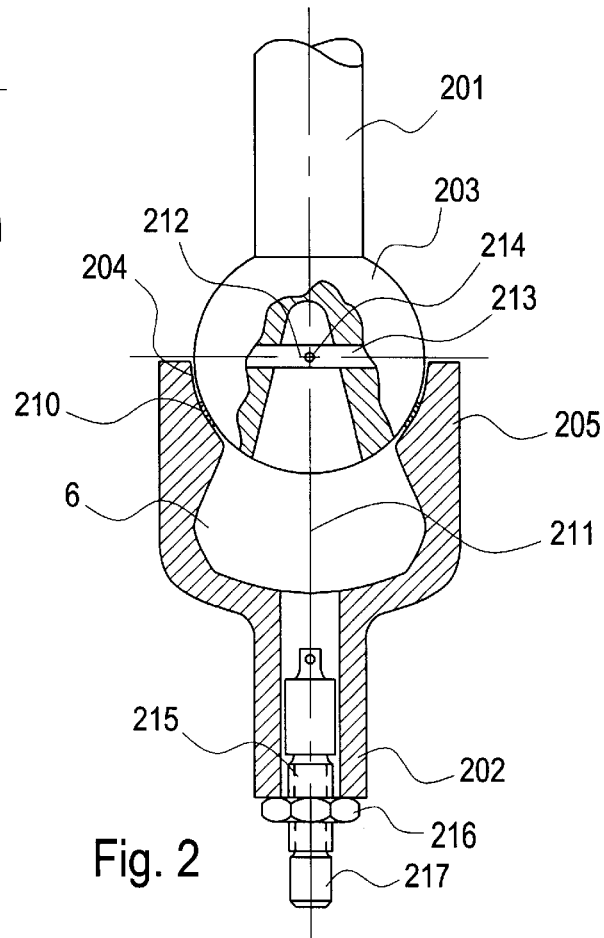
FIG. 2 is an axial cross section of one embodiment of the proposed invention having the socket represented by a segment of a concave spherical surface.

FIG. 2 shows one embodiment of the proposed three-degrees-of-freedom rotational joint connecting links 201 and 202. Link 201 is attached to convex spherical member 203 which is concentrically surrounded by segmented concave spherical surface (cavity) 204 of socket 205. The radius of spherical cavity 204 is greater than the radius of spherical member 203. Spherical member 203 and spherical cavity 204 are not touching each other and are interacting via thin elastomeric element or thin-layered elastomer-metal laminate 210 (which may be undivided or may consist from several detached pieces placed in the different areas of the gap between components 203 and 204). Compression (preload) force is applied to elastomeric (rubber) element 210 by pretensioning elongated tensile member (preferably, wire or cable) 211 fastened to the central part of spherical member 203 and to link 202. Attachment of wire 211 to spherical member 203 can be made by any known means. The embodiment in FIG. 2 has pin 212 diametrally inserted into hole 213 bored through spherical member 203. Wire 211 may be threaded into small hole 214 in pin 212 as shown or wrapped around pin 212 or attached by any other appropriate technique to spherical member 203. The other end of wire 211 is fastened to link 202 in a stretched condition so that it applies the specified force between spherical member 203 and link 202. In the embodiment in FIG. 2 the tension force to wire 211 is applied by tensioning mechanism comprising threaded stud 215 to which wire 211 is fastened, and tensioning nut 216. Stud 215 is prevented from rotation during tightening by holding its squared end 217. Other techniques can be used such as making wire 211 from a shape memory alloy (SMA), and assembling the joint without stretching wire 211 which was plastically deformed before assembly at the temperature above the "transformation temperature". After assembly, the temperature is reduced to the working temperature and the wire tends to return to its initial length before stretching, thus generating the required tensile force. For some SMAs, the assembly should be made at the temperature below the transformation temperature and the preloading force develops when wire 211 warms up to the ambient temperature.

Elastomeric element 210 or every piece of it if the latter is composed from several pieces, is characterized by high "shape factor". The "shape factor" S is a generally accepted coefficient describing geometry of a single layer elastomeric (rubber) element bonded by adhesives or by friction to rigid, e.g. metal, surfaces and is defined as a ratio between the surface area of one loaded surface and the total "free surface" area along which the rubber can bulge. Since rubber materials are quasi-incompressible materials (Poisson's ratio is close to 0.5), freedom of bulging expressed by the shape factor determines compression stiffness of a rubber element (the higher S, the greater is its compression stiffness relative to its shear stiffness). For example, for a rectangular rubber element with dimensions a, b, h, where a≧b and h is thickness, the shape factor $$S = \frac{ab}{2ah + 2bh} = \frac{ab}{2h(a+b)}.$$

"High shape factor" in this specification means S≧~1.5. For square elastomeric elements (α=b), such values of S materialize at a/h≧6; such elastomeric element is called here a "thin-layer" or "thin-layered" element.

It is known, e.g. see E. I. Rivin, "*Ultra-Thin-Layered Rubber-Metal Laminates for Limited Travel Bearings,*" *Tribology International,* 1983, Vol.16, No. 1, pp.17–25, that thin layers of rubber which are bonded (by adhesives, friction, etc.) to rigid, e.g. metal, surfaces possess such properties as high (and further increasing with increasing compression load) stiffness and load-carrying capacity in compression while having low stiffness in the perpendicular directions (shear). The compression stiffness can be at least 1–5,000 times greater than the shear stiffness, and the shear stiffness (resistance force to shear deformation) does not change noticeably with changing compression load. This property compares beneficially with the sliding friction force that increases proportionally to the normal (compression) force applied to the sliding connection. The destructive (ultimate) compression load for properly manufactured thin-layer rubber elements can exceed 650 MPa (100,000 psi). The maximum allowable shear deformation is at least 100–150% of the layer thickness h, depending on the rubber blend. When larger shear displacements are required, several rubber layers can be stacked (laminated) with rigid (e.g., metal) layers bonded between the rubber layers. Such an arrangement retains the quoted above high load-carrying capacity in compression although the compression stiffness would be reduced inversely proportional to the number of rubber layers.

Figure 3:
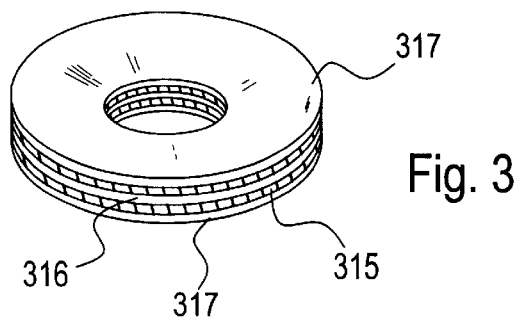
FIG. 3 shows construction of a spherical thin-layered elastomer-metal laminate.

Both individual thin rubber layers and, to a lesser degree, the thin-layered rubber-metal laminates of flat shape would conform to non-planar supporting surfaces if they are compressed between these surfaces, provided that the elements/laminates are small and/or curvature radii are large enough for a given design and size of the layer/laminate. A more precise conformity for large layers/laminates can be realized if these elements are prefabricated with the desired curvature, or are applied to the non-flat (e.g., spherical) surface in their pliable (non-cured) condition and are cured after being conformed to the non-flat surface. FIG. 3 presents a spherical thin-layered rubber-metal laminate in which thin rubber layers 315 are bonded to intermediate metal layers 316 and to face metal layers 317. Face metal layers 317 can be made identical in thickness or thicker than intermediate layers 316. All rubber and metal layers are, preferably, concentric. In this case, radius of each layer is larger than the radius of the preceding (closer to the center) layer by the thickness of the layer.

Thus, the design in FIG. 2 after assembly and application of the preload becomes a force-locked unit which can take not only compressive, but also tensile forces between links 201 and 202 (pulling from each other), provided that these forces do not exceed the preload force. Compression forces between links 201 and 202 (pushing them towards each other) do not change preload of element(s) 210 if the compression force does not exceed the preload force. Otherwise, the force on element(s) 210 would further increase.

In an embodiment of the present invention where spherical member 203 has diameter 25 mm (~1.0 in.), three symmetrically placed round sections (pieces) of rubber-metal laminate are used as element 210. Each section has diameter 10 mm (0.4 in.) and surface area $\pi \times 5^2 = 78.5$ mm$^2$=0.0000785 m$^2$(0.16 sq. in.). With compression strength 650 MPa (100,000 psi), each section can withstand compression force 51,000 N (11,300 lbs), and three sections together can withstand compression force 153,000 N (~34,000 lbs). Assuming a conservative safety factor 3.0, the allowable compression force is 51,000 N (11,300 lbs). With the preload force 30,000 N (6,700 lbs), the joint can safely withstand a tensile force of at least 20,000 N (4,500 lbs) and a compressive force of 51,000 N (11,300 lbs). For comparison, a commercially available prior art ball joint made by TRW Co. having 1 in. (25.4 mm) diameter ball has the rated load 3,000 lbs (13,500 N). This ball joint has the rated angular displacements±16 deg. (±0.28 rad). The angular displacement in the FIG. 2 design is $\alpha = \Delta/(R+H/2)$, where $\Delta$ is shear deformation of element 210, H is total thickness of rubber in element 210, R is radius of the convex spherical member. Conservatively assuming the allowable shear deformation as 130% of the total thickness of rubber, $\Delta = 1.3H$, the required total thickness of rubber layers in element 210 is $$H = \frac{\alpha R}{1.3 - \alpha/2} = 0.28 \times 25 / 1.16 = 6 \text{ mm}.$$

The design shown in FIG. 2 is force-locked and thus does not require a captive arrangement for convex spherical member 203. The preload also completely eliminates backlash. Since the convex surface of spherical member 203 does not touch the concave surface of the spherical cavity constituting socket 204, selection of materials for components 203 and 204 is not critical and they can be made from light metals or from plastics. This, together with elimination of the provision for the captive arrangement for spherical member 203, results in significant reductions of weight and manufacturing costs. Since the angular displacements are realized by internal shear in element 210, they are absolutely sensitive to even minute forces. Lubrication and protection from external contamination are not required, and forces required to effect angular displacements under high tension/compression forces between links 201 and 202 are much smaller than the sliding friction forces in the prior art ball joints.

Figure 4:
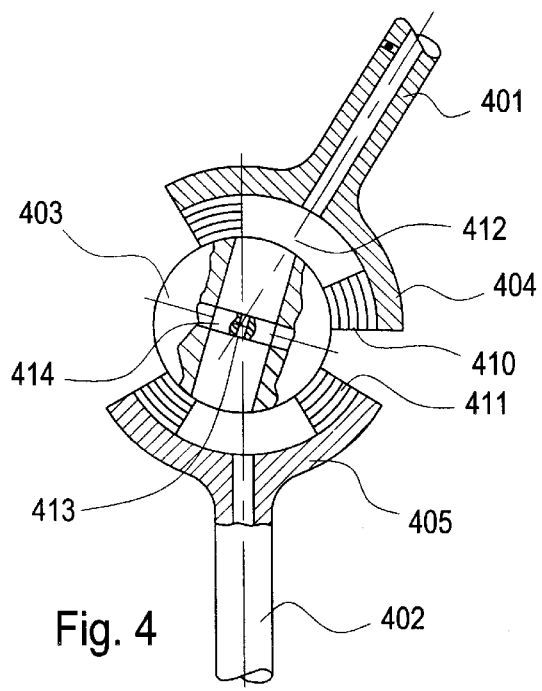
FIG. 4 is an axial cross section of another embodiment of the present invention having the socket represented by two separate segments of a concave spherical surface.

FIG. 4 shows another embodiment of the three-degrees-of-freedom rotational joint wherein links 401 and 402 have attached to them sockets 404 and 405, respectively, comprising partial concave spherical surfaces and connected between themselves via convex spherical member 403 (ball) and elastomeric thin-layered laminated elements 410, 411 squeezed between convex spherical member 403 and sockets 404 and 405, respectively. Tensile preload forces are applied between links 401, thus preloading (in compression) elastomeric elements 410 and 411. Preload forces can be applied by any preload means designed into the joint. FIG. 4 shows preload being realized by wire/cable 412 attached to both links 401, 402. One end of wire/cable 412 is attached to link 401, another end—to link 402. Wire/cable is passing through hole 413 in pin 414, which in turn is passing through diametric hole in spherical member 403. Wire/cable 412 can also be wrapped around pin 414. Prestressed wire/cable (e.g., one made from a shape memory alloy) is shown in FIG. 4, with details of attachment not elaborated. Adjustable device as in FIG. 2 can be used, as well as any other load application device.

While having the same mode of operation as the embodiment in FIG. 2, the embodiment in FIG. 4 has an advantage of doubling the ranges of angular displacements in all three degrees of freedom for a given total rubber thickness of elastomeric elements 410, 411 or reducing the required thickness of rubber in elastomeric elements 410, 411 for a given range of angular displacements. For the parameters in the above numerical example, 3 mm total rubber thickness of each elastomeric element 410, 411 would be required in order to realize ±16 deg. angular displacements. Another advantage of this embodiment is the fact that spherical member 403 is "free floating" and does not require to be attached to or to be a part of either of links 401, 402. This is especially desirable if a difficult to machine material is used for making convex spherical member 403.

Figure 5:
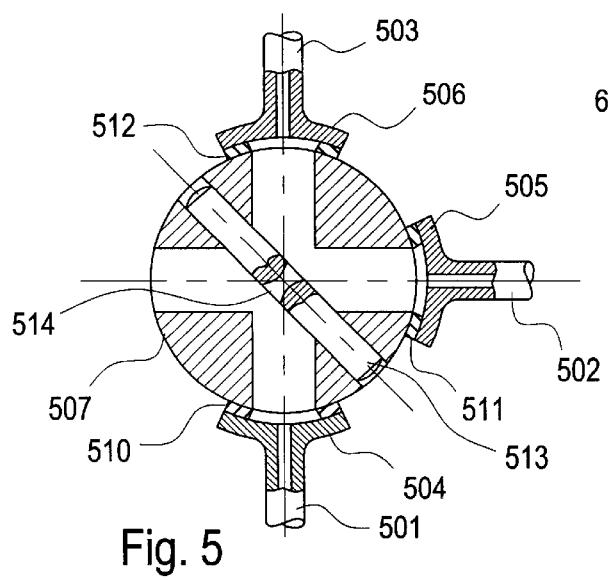
FIG. 5 is an axial cross section of yet another embodiment of the present invention, whereas the socket is represented by three separate segments of a concave spherical surface; all three segments can be located in two intersecting planes but are shown as located in one plane.

FIG. 5 depicts another embodiment of the proposed invention wherein the joint is connecting three links 501, 502, 503. Sockets 504, 505, 506 comprising partial concave spherical surfaces are secured to links 501, 502, 503, respectively, and each socket is connected to convex spherical member 507 via precompressed elastomeric elements 510, 511, 512, respectively. While three links 501, 502, 503 are shown to be located in one plane, their relative positioning in 3D space depends only on design needs, and generally these links are not located in one plane. Each elastomeric element 510, 511, 512 is preloaded by application of a tensile force between the respective link and spherical member 507 or between pairs of the connected links. Any preloading means can be used, while FIG. 5 depicts stretched wires/cables with one end of each wire/cable being secured to two links (details not shown). Both wires/cables are passing through hole 514 in pin 513 or are wrapped around pin 513, and the other ends of both wires/cables are secured in the prestressed condition to the third link or to an adjustable tensioning device on the third link.

The embodiment in FIG. 5 can be used for complex mechanisms where relative angular mobility between three links is required, as well as for connecting bars in 3D trusses.

Figure 6:
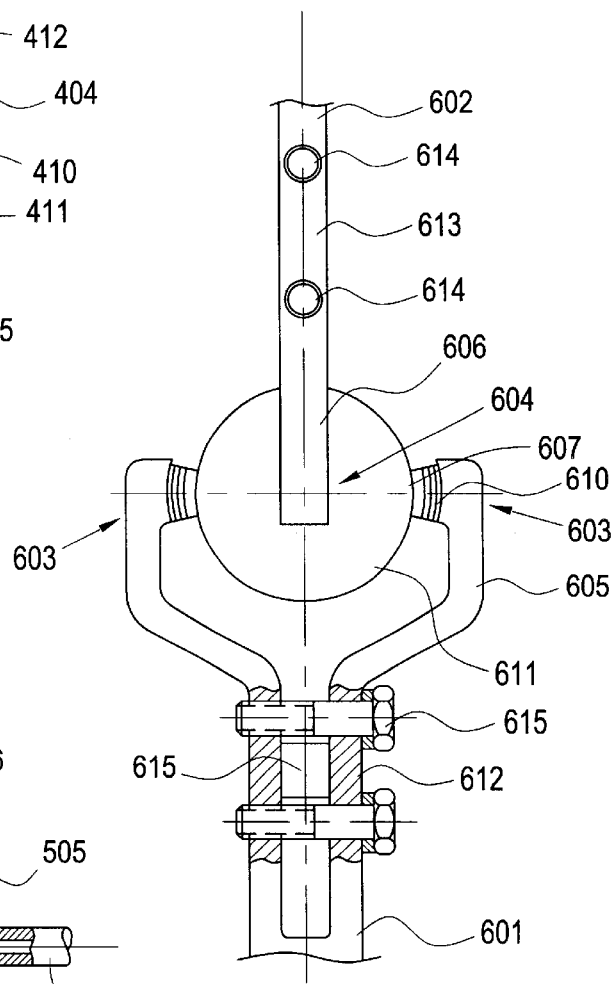
FIG. 6 shows yet another embodiment of the present invention, whereas the socket is comprised of fragmented small segments of a concave spherical surface.

The embodiment shown in FIG. 6 might be useful in cases when there are no significant tension/compression forces between the connected links but weight of the joint is of critical importance. Connected links 601 and 602 have sockets 603, 604, respectively, attached to them. Sockets 603 and 604 are embodied as a plurality of "fingers" 605, 606, respectively, each finger having at its end a relatively small concave spherical segment 607. These segments 607 are shown for fingers 605, the segments are of the same design and appearance on fingers 606. Spherical segment-shaped elastomeric elements 610 are squeezed between these spherical cavity segments and the surface of spherical member 611. Two sockets having two fingers each are shown in FIG. 6. However, larger numbers of fingers might be used under special circumstances.

Finger extensions 612, 613 connect fingers to links 601, 602, respectively. Distance between the finger extensions can be adjusted by threaded connectors 614, 615 or by other means. Reducing the distance(s) between the finger extensions is creating preload on elastomeric elements 610, which can be controlled by spacers 616.

It is readily apparent that the components of the three-degrees-of-freedom rotational joint disclosed herein may take a variety of configurations. Thus, the embodiments and exemplifications shown and described herein are meant for illustrative purposes only and are not intended to limit the scope of the present invention, the true scope of which is limited solely by the claims appended thereto.

What is claimed is:

1. A joint for connecting at least two mechanical links so as to allow them relative limited rotational mobility about three intersecting inone point mutually perpendicular axes, comprising:
   a spherical member having at least one convex spherical surface segment centered at said intersection point and attached to one of said mechanical links:
   at least one socket, each having at least one concave spherical surface segment centered at said intersection point, each socket attached to one mechanical link other than the link attached to said spherical member and the links, if any, attached to other sockets;
   at least one elastomeric element with shape factor $S \geq \sim 1.5$ and having spherical convex outer surface and spherical concave inner surface, both surfaces centered at said intersection point;
   at least one elongated tensile member disposed between and attached to the mechanical link which is attached to said spherical member, and to each link attached to the sockets;
   wherein:
      said concave spherical surface segments of each socket are co-located with said convex spherical surface segments of said spherical member, and these concave and convex spherical surfaces are separated by radially preloaded in compression said elastomeric elements, with the sustained preloading force applied by said elongated tensile members.

2. The joint of claim 1, wherein said elongated tensile members are wires.

3. The joint of claim 1, wherein said elongated tensile members are cables.

4. The joint of claim 1, wherein said elongated tensile members are made from a shape memory material.

5. The joint of claim 1, wherein said elastomeric element comprises a laminate of elastomeric layers each having shape factor $S \geq 1.5$ and rigid layers.

6. The joint in claim 1 further comprising tensioning means for each elongated tensile member providing sustained and adjustable tension in order to realize the specified compression preload of said elastomeric elements.

7. A joint for connecting at least two mechanical links so as to allow them relative limited rotational mobility about three intersecting in one point mutually perpendicular axes, comprising:
   a spherical member having at least one convex spherical surface segment centered at said intersection point;
   at least two sockets, each having at least one concave spherical surface segment centered at said intersection point, each socket attached to one mechanical link other than the links attached to other sockets;
   elastomeric elements each having shape factor $S \geq \sim 1.5$ and having spherical convex outer surface and spherical concave inner surface, both centered at said intersection point;
   at least one elongated tensile member disposed between and connecting each two mechanical links and passing through holes in the body of said spherical member about its center;
   wherein:
      said concave spherical surface segments of each socket are co-located with said convex spherical surface segments of said spherical member, and these concave and convex spherical surfaces are separated by radially preloaded in compression said elastomeric elements, with the sustained preloading force applied by said elongated tensile members.

8. The joint of claim 7 wherein said elongated tensile members connect each link with said spherical member.

9. The joint in claim 7 further comprising tensioning means for each elongated tensile member providing sustained and adjustable tension in order to realize the specified compression preload of said elastomeric elements.

10. The joint of claim 7, wherein said elongated members are wires.

11. The joint of claim 7 wherein said elongated members are cables.

12. The joint of claim 7 wherein said elongated members are made from a shape memory material.

13. The joint of claim 7 wherein each elastomeric element comprises a plurality of smaller elements each having shape factor $S \geq \sim 1.5$, each smaller element located at the specified positions between said convex and concave spherical surfaces.

* * * * *